United States Patent [19]
Shibata

[11] 3,754,174
[45] Aug. 21, 1973

[54] EXCITING METHOD OF ELECTRIC MACHINE COMBINING ELECTROMAGNETIC COUPLING WITH ELECTRIC ROTATING MACHINE

[75] Inventor: Fukuo Shibata, Nishinomiya-shi, Hyogo, Japan

[73] Assignee: Kawasaki Jukogyo Kabushiki Kaisha, Hyogo, Japan

[22] Filed: Aug. 4, 1972

[21] Appl. No.: 278,150

[30] Foreign Application Priority Data

Aug. 6, 1971 Japan.......................... 46/59779
Nov. 15, 1971 Japan........................ 46/91394

[52] U.S. Cl...................... 318/9, 318/197, 318/205
[51] Int. Cl. ............................................ H02p 7/36
[58] Field of Search ................. 318/9, 10, 197, 205, 318/430

[56] References Cited
UNITED STATES PATENTS

| | | | |
|---|---|---|---|
| 1,983,896 | 12/1934 | Bottcher | 318/205 |
| 3,488,567 | 1/1970 | Shibata | 318/197 |
| 3,683,249 | 8/1972 | Shibata | 318/205 |

*Primary Examiner*—Bernard A. Gilheany
*Assistant Examiner*—W. E. Duncanson, Jr.
*Attorney*—Richard C. Sughrue, Darryl Mexic et al.

[57] ABSTRACT

An electromagnetic coupling is connected mechanically with an electric machine whose armature winding is connected electrically with that of the electromagnetic coupling, and one of the two rotors of the electromagnetic coupling drives a load and the other rotor is driven by a driving machine. There is provided a transformer whose primary winding is supplied with electric power from the armature winding of the electromagnetic coupling and from which an exciting current is supplied to the field winding of the electromagnetic coupling or of the electric machine. By this arrangement, the whole installation will be compact and the stability will be high.

15 Claims, 9 Drawing Figures

Patented Aug. 21, 1973
3,754,174
3 Sheets-Sheet 1
FIG.1
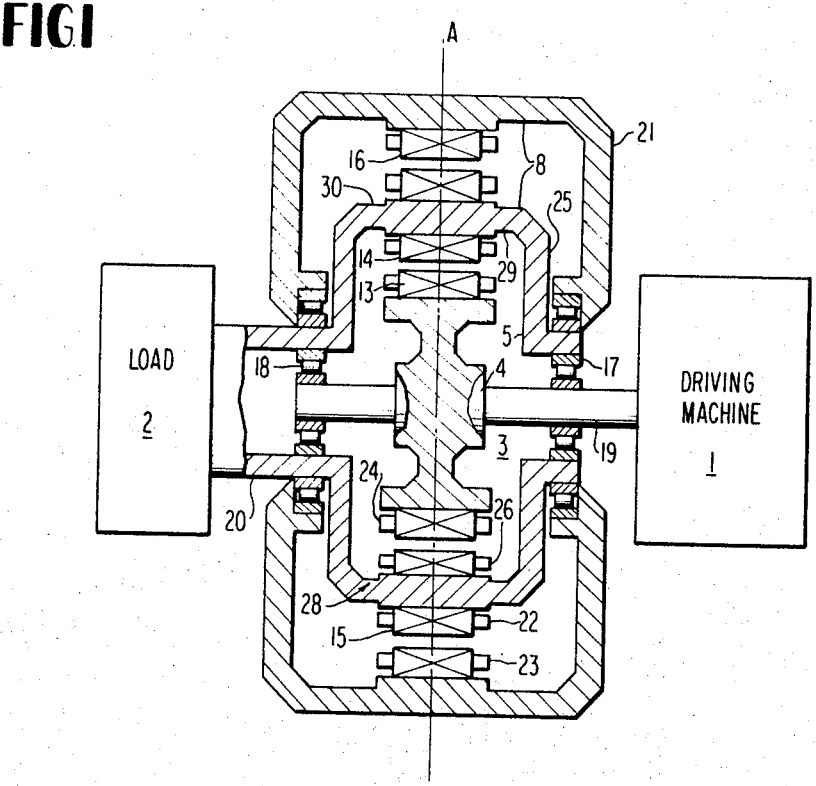
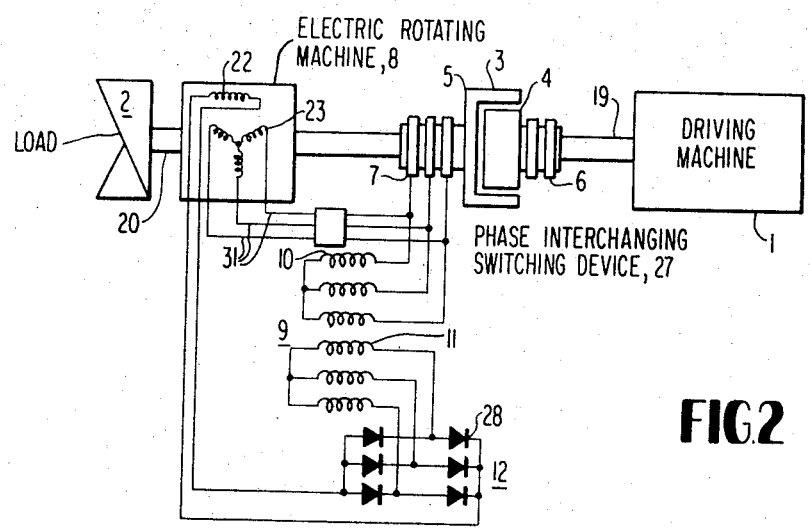
FIG.2

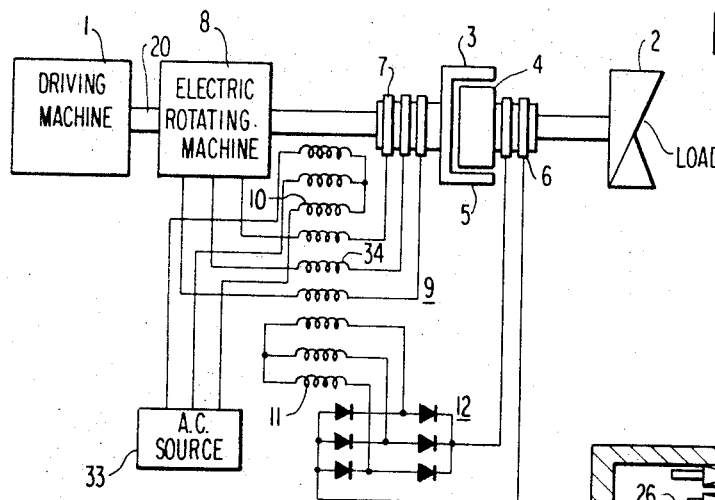
FIG.6
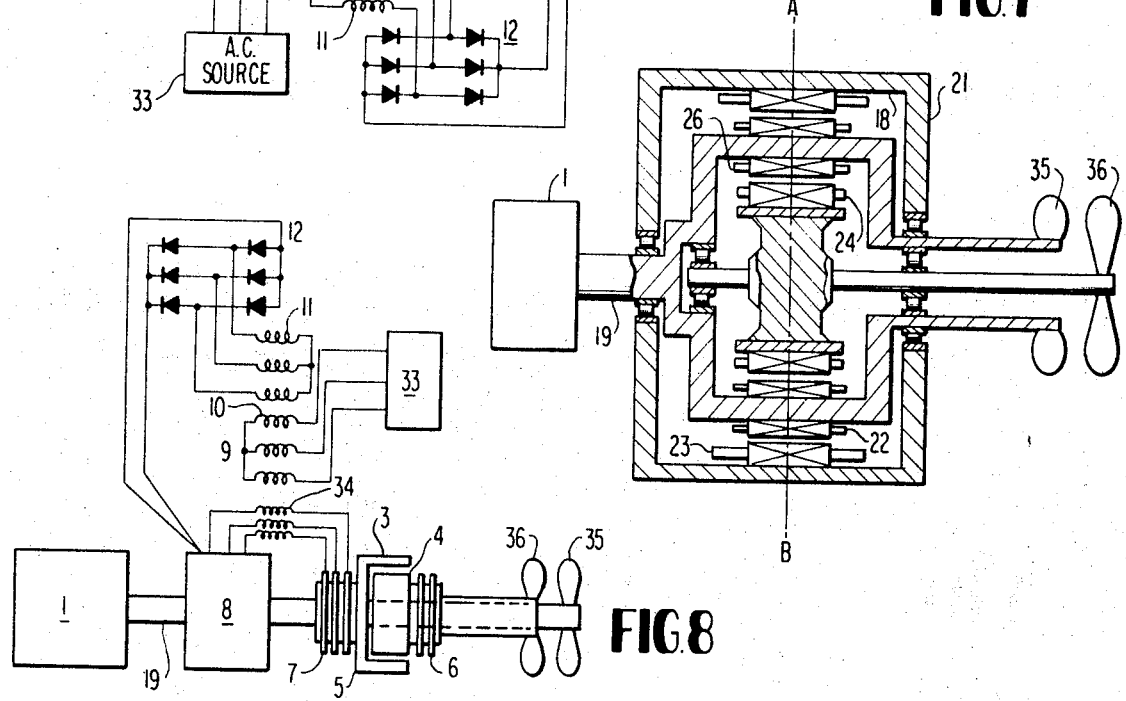
FIG.7
FIG.8
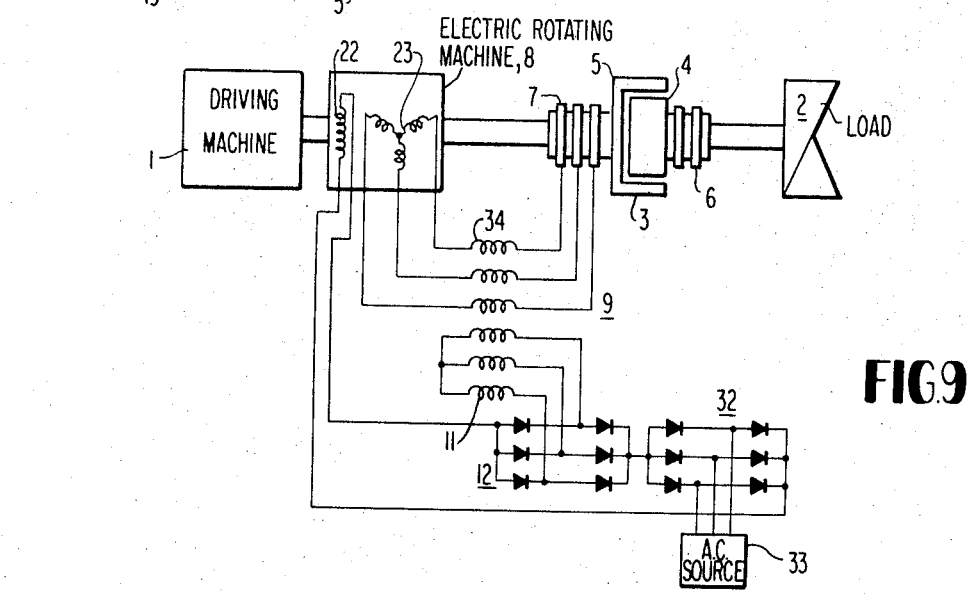
FIG.9

EXCITING METHOD OF ELECTRIC MACHINE COMBINING ELECTROMAGNETIC COUPLING WITH ELECTRIC ROTATING MACHINE

BACKGROUND OF THE INVENTION

This invention is used in fields in which it is necessary to transmit an output of a prime mover such as a diesel engine to a load such as a propeller of a ship, a wheel of a car, pump, etc. Of course, a steam turbine, a water wheel, an electric motor, a gas turbine, etc., can also be used as the prime mover.

In some prior arrangements in which outputs of prime movers are transmitted to loads, gears are used to increase or reduce speeds. In general, a gear composed of a gear wheel and a pinion cannot be used to control either the ratio of increase or reduction of the speed, or direction of rotation of a load. In other words, when only a gear composed of one gear wheel and one pinion is inserted between a prime mover and a load, the speed of the load cannot be controlled or changed by the gear itself, and the direction of the rotation of the load cannot be changed if the direction of the rotation of the prime mover is kept constant. In order to control the ratio of increase or reduction of the speed of a gear, it is necessary to add at least one pinion or one gear wheel to the gear composed of one gear wheel and one pinion, as shown in a gear box by which speed of car can be changed. In order to control the direction of rotation of a load by a gear, it is necessary to add at least an idler gear to the gear composed of one gear wheel and one pinion, as shown in a reverse gear. Thus, in order to control ratio of increase or reduction of a load by a gear, the construction of the gear becomes considerably complicated.

In order to provide an arrangement transmitting an output of a prime mover to a load in which the direction of the load can be changed while keeping the direction of the rotation of the prime mover constant, the inventor of this invention devised an invention filed as U.S. Pat. application Ser. No. 53,413 now U.S. Pat. No. 3,683,249.

In U.S. Pat. application Ser. No. 53,413, there is shown an electric machine arrangement which has a combination of: an electromagnetic coupling having two rotors which rotate with respect to each other and one of which is provided with an armature winding; an electric rotating machine having a stator, a rotor and an armature winding in which alternating current flows; mechanical combination of one of the said two rotors of the said electromagnetic coupling with the said rotor of the said electric rotating machine; and electric connection between the said armature winding of the said electromagnetic coupling and the said armature winding of the said electric rotating machine through a phase interchanging switching device.

However, there is an important problem in connection with the exciting method of the electric machine combining electromagnetic coupling with electric rotating machine. If the exciting currents of the field windings of the electric machine are supplied from another electric source, the electric power source is necessary and the whole installation becomes complicated and expensive.

Further, there is another important problem in connection with the transient stability of the electric machine. If the electric machine is suddenly overloaded, the rotor of the electric machine is subject to "pull out."

SUMMARY OF THE INVENTION

It is the primary object of the invention to provide an electric machine arrangement transmitting an output of a prime mover or a driving machine to a load which is very simple and efficient in operation and which may be readily and economically manufactured and installed.

Another object of the invention is to provide an electric machine arrangement transmitting an output of a prime mover or a driving machine to a load in which the direction of the rotation of the load can be changed while keeping the direction of the rotation of the prime mover or the driving machine constant and which is very simply and economically manufactured.

An additional object of this invention is to provide an electric machine arrangement transmitting an output of a prime mover or a driving machine to a load in which the transient stability of the electric machine can be kept on a high level.

Other objects of this invention will in part be obvious and in part appear hereinafter.

Accordingly, this invention is disclosed in the embodiments thereof shown in the accompanying drawings and comprises the features of constructions, combination of elements and arrangements of parts which will be indicated in the appended claims.

BRIEF DESCRIPTION OF DRAWINGS

FIG. 1 and FIG. 7 illustrate respectively embodiments of a partial construction of an arrangement of this invention.

FIG. 2, FIG. 3, FIG. 4, FIG. 5, FIG. 6, FIG. 8 and FIG. 9 illustrate diagramatically systems of this invention.

DESCRIPTION OF THE PREFERRED EMBODIMENTS

Figure 3:
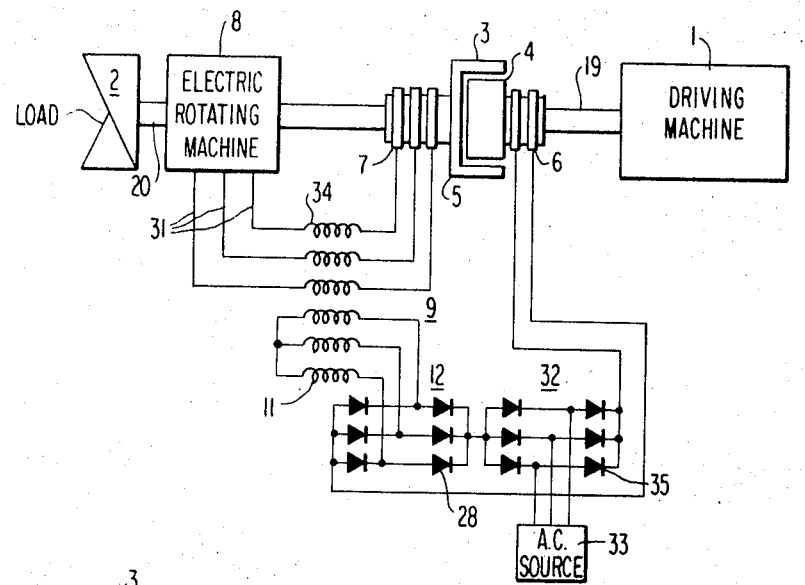

As shown in FIG. 1 and FIG. 2, an electric machine arrangement of this invention has a combination of: an electric rotating machine 8 having a stator 21, a rotor 25, a field winding 22 and an armature winding 23 in which alternating current flows; an electromagnetic coupling 3 having two rotors 4, 5 which rotate with respect to each other, one of which is provided with an armature winding 26, and the other of which is provided with a field winding 24; one of the said two rotors 4, 5 of the said electromagnetic coupling 3 being mechanically combined with the said rotor 25 of the said electric rotating machine 8; the said armature winding 26 of the said electromagnetic coupling 3 and the said armature winding 23 of the electric rotating machine 8 being electrically connected with each other; a transformer 9 having at least one primary winding 10 and a secondary winding 11; a converter 12 which is composed of rectifiers 28; at least one of the said field windings 22, 24 and the secondary winding 11 of the said transformer 9 being connected electrically through the said converter 12; one of the said armature windings 23, 26 being connected electrically with the said primary winding 10 of the transformer 9; wherein one of the said rotors 5, 4 of the electromagnetic coupling 3 being arranged to drive a load 2, and the other rotor 4 of the electromagnetic coupling 3 being arranged to be driven by a driving machine 1.

In FIG. 1, which is an embodiment of a partial construction of this invention and which shows an example of the mechanical combination between the rotor 25 of the electric rotating machine 8 and the rotor 5 of the electromagnetic coupling 3, one of the two rotors 4, 5 of the electromagnetic coupling 3 is mechanically combined with the rotor 25 of the electric rotating machine 8 in such a manner that a rotor 5, of which a circumferential inner part 29 of a cylinder 28 is provided with a magnetic member 14 forming a magnetic circuit for the electromagnetic coupling 3, and of which a circumferential outer part 30 of the cylinder 28 is provided with a magnetic member 15 forming a magnetic circuit for the electric rotating machine 8 is used in common as one of the two rotors 4, 5 of the electromagnetic coupling 3 and as the rotor 25 of the electric rotating machine 8, and rotates in a space between the stator 21 of the electric rotating machine 8 and the other rotor 4 of the electromagnetic coupling 3. An example of the electric rotating machine 8 is a synchronous machine having a damper winding which is buried in the face of the material 15 of the magnetic field pole, although it is not shown in FIG. 1.

In FIG. 1 and FIG. 2, a rotor 4 of the electromagnetic coupling 3 is provided with a field winding 24 and sliprings 6 which is to be electrically connected with a direct current source, although the direct current source is not shown in FIG. 1 and FIG. 2; and a rotor 5 is provided with an armature winding 26 and sliprings 7 which is electrically connected with an armature winding 23 of the electric rotating machine 8 through electric wirings 31 and a phase interchanging switching device 27.

A propeller of a ship, a wheel of a car, a fan, a pump, etc., are examples of the load 2. Prime movers such as a diesel engine, a steam turbine, a water wheel, an electric motor, a gas turbine, etc., are examples of the driving machine 1. In FIG. 1, it can be so arranged that the direction of rotation of the rotor 25 of the electric rotating machine 8 is not only the same as, but also opposite to the direction of rotation of the rotor 4 of the electromagnetic coupling 3 driven by the driving machine 1. The phase interchanging switching device 27 is connected electrically in the main circuit of electric wirings 31 which is inserted between the armature winding 23 of the electric rotating machine 8 and the armature winding 26 of the electromagnetic coupling 3.

Symbols 17, 18 show bearings, and a symbol 13 shows a magnetic member forming a magnetic circuit in the rotor 4 of the electromagnetic coupling 3 in FIG. 1. When the electric machine of FIG. 1 is cut by a section AB perpendicular to the revolving axis 19 of the rotor 4, there is a face of a magnetic member 16 forming a magnetic circuit in the stator of the electric rotating machine 8 and a face of the magnetic member 13 forming a magnetic circuit in the inner rotor 4 of the electromagnetic coupling 3 in FIG. 1. Symbols 19, 20 show revolving axes of two rotors of the electromagnetic coupling 3. Although the rotor 5 of the electromagnetic coupling 3 used in common with the rotor 25 of the electric rotating machine 8 is provided with the armature winding 26 in FIG. 1 and FIG. 2, it is possible that the inner rotor 4 of the electromagnetic coupling 3 coupled mechanically with the driving machine 1 can be provided with the armature winding 26 and the outer rotor 5 can be provided with the field winding 24 of the electromagnetic coupling 3.

In FIG. 2, the rotor 5 of the electromagnetic coupling 3 combined mechanically with the rotor of the electric rotating machine 8 drives the load 2, and the other rotor 4 of the electromagnetic coupling 3 is driven by the driving machine 1. The field winding 22 of the electric rotating machine 8 is connected electrically with the secondary winding 11 of the transformer 9 through the converter 12, and the armature winding of the electromagnetic coupling 3 is connected electrically with the primary winding 10 of the transformer 11. The primary winding 10 of the transformer 9 is a voltage winding which is electrically connected with the armature winding of the electromagnetic coupling 3 in FIG. 2.

In FIG. 3, the field winding, which is not shown in the figure but is contained in the rotor 4 and which is connected electrically with the sliprings 6, is connected electrically with the secondary winding 11 of the transformer 9 through the converter 12; and the armature winding of the electric rotating machine 8 is connected electrically with the primary winding 31 of the transformer 9. The primary winding 34 of the transformer 9 is a current winding which is electrically connected between the armature winding of the electromagnetic coupling and the armature winding of the electric rotating machine 8.

In FIG. 2, FIG. 3, the armature winding of the electromagnetic coupling 3 is not shown in the figure but is contained in the rotor 5, and is connected electrically with the sliprings 7.

In FIG. 3, there is provided a second converter 32 which is composed of rectifiers 35 and whose D.C. terminals are connected electrically in series with the D.C. terminals of the converter 12 described before to the field winding of the electromagnetic coupling 3, further the A.C. terminals of the second converter 32 are connected electrically with an electric (alternating current) source other than the armature windings of the electromagnetic coupling 3 and of the electric rotating machine 8.

Figure 4:
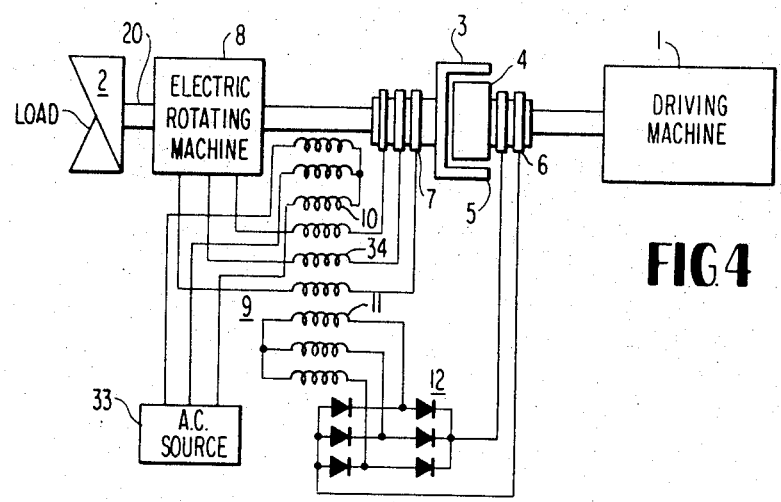

In FIG. 4, the primary winding 10 of the transformer 9 is a voltage winding which is electrically connected with an electric source (alternating current source) 33 other than the armature windings of the electromagnetic coupling 3 and of the electric rotating machine 8.

Figure 5:
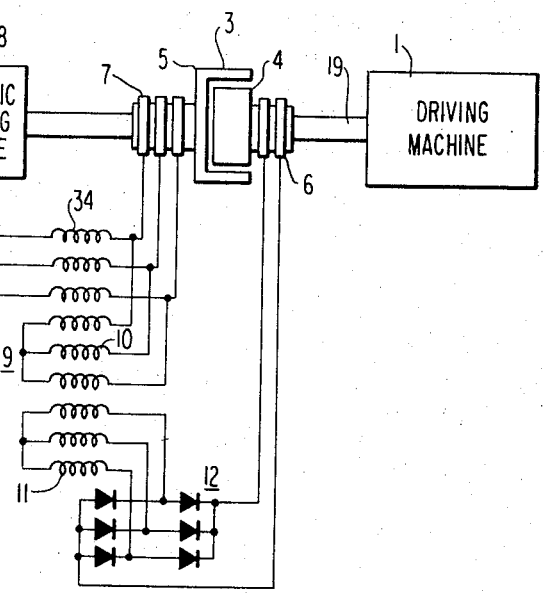

In FIG. 5, the transformer 9 has two kinds of primary windings one of which is a voltage winding 10 connected electrically with the armature windings of the electromagnetic coupling 3 and the other of which is a current winding 34 connected electrically between the armature winding of the electromagnetic coupling 3 and the armature winding of the electric rotating machine 8.

In FIG. 4, the transformer 9 has two kinds of primary windings, one of which is a voltage winding 10 connected electrically with an electric source 33 (alternating current source) other than the armature windings of the electromagnetic coupling 3 and of the electric rotating machine 8, and the other of which is a current winding 34 connected electrically between the armature winding of the electromagnetic coupling 3 and the armature winding of the electric rotating machine 8.

In FIG. 6, the rotor 5 of the electromagnetic coupling 3 combined mechanically with the rotor of the electric rotating machine 8 is driven by the driving machine 1 and the other rotor 4 of the electromagnetic coupling 3 drives the load 2. The field winding of the electromagnetic coupling 3, which is not shown but is contained in the rotor 4 and is electrically connected with the sliprings 6, is connected electrically with the secondary winding 11 of the transformer 9 through the converter 12; and the armature winding of the electric rotating machine 8 is connected electrically with the primary winding of the transformer 9.

In FIG. 9, the transformer 9 has a primary winding 34, which is electrically connected between the armature winding of the electromagnetic coupling 3 and the armature winding 23 of the electric rotating machine 8, and a secondary winding 11 which is electrically connected with the field winding 22 of the electric rotating machine 8 through the first converter 12 and the second converter 32. The A.C. terminals of the second converter 32 is electrically connected with the electric source (alternating current source) 33.

In FIG. 7 and FIG. 8, the rotor 5 of the electromagnetic coupling 3 combined mechanically with the rotor of the electric rotating machine 8 is driven by the driving machine 1 and drives a propeller 35 of a ship, and the other rotor of the electromagnetic coupling 3 drives another propeller 36 of the ship. The field winding 22 of the electric rotating machine 8 is connected electrically with the secondary winding 11 of the transformer 9 through the converter 12, and the armature winding of the electric rotating machine 8 is connected electrically with the primary winding 34 of the transformer 9.

Until now, it has been explained that only one of the field windings of the electric machine arrangement is electrically connected with the secondary winding 11 of the transformer 9 through the converter 12. However, it can be so arranged that both the field windings of the electric rotating machine 8 and of the electromagnetic coupling 3 are connected with the secondary winding of the transformer 9.

In FIG. 2, if the revolutions per minute of rotors 4 and 5 of the electromagnetic coupling 3 are respectively $N_4$ and $N_5$, and $N_4 > N_5$, we can obtain $$N_4 - N_5 = N_o \quad (1)$$

$$N_4 + N_5 = N_o \quad (2)$$

where $N_o$ is revolutions per minute of the rotor 4 in relation to the rotor 5. When the direction of the rotation of the rotor 5 is the same as that of the rotor 4, the equation (1) is obtained, and when the direction of the rotor 5 is opposite to that of the rotor 4, equation (2) is obtained. Whether the direction of the rotation of the rotor 5 is the same as that of the rotor 4 or not, the electromagnetic coupling 3 acts not only as a coupling but also as a generator.

In such a case, an electric machine combining an electromagnetic coupling 3 with an electric rotating machine 8 can transmit an output of a driving machine 1 to a load 2, and further, the direction of the rotation of the load 2 can be changed while keeping the direction of the rotation of the driving machine 1 constant.

If the numbers of the poles of the electromagnetic coupling 3 and the electric rotating machine 8 are respectively $P_3$ and $P_8$, and the frequency of the alternating current flowing in the circuit between the electric rotating machine 8 and the electromagnetic coupling 3 is $f$, we can obtain $$N_o = 120\, f/P_3 \quad (3)$$

$$N_5 = 120\, f/P_8 \quad (4)$$

Therefore, $$N_o/N_5 = P_8/P_3 \quad (5)$$

From equations (1), (2) and (5), $$N_4 = [(P_8/P_3) + 1]N_5 \quad (6)$$

$$N_4 = [(P_8/P_3) - 1]N_5 \quad (7)$$

If $P_8 > P_3$, the direction of rotation of the rotor 25 of the electric rotating machine 8 can be opposite to the direction of rotation of the rotor 4 of the electromagnetic coupling 3.

As is understood from the above explanation, the construction shown in FIG. 1 and FIG. 2, made by the combination of the electromagnetic coupling 3 and the electric rotating machine 8, can be operated as a device similar to a reduction gear. The direction of the rotation of the load 2 can be changed while keeping the direction of the rotation of the prime mover or the driving machine 1 constant, if the phase interchanging switching device 27 is used.

If $P_3 > P_8$, the direction of rotation of the rotor 25 of the electric rotating machine 8, or of the rotor 5 of the electromagnetic coupling 3, cannot be opposite to the direction of rotation of the rotor 4 of the electromagnetic coupling 3. However, even if $P_3 > P_8$, the construction shown in FIG. 1 and FIG. 2, made by the combination of the electromagnetic coupling 3 and the electric rotating machine 8, can be operated as a device similar to a reduction gear. In this case, it is not necessary to use a phase interchanging switching device in the circuit of the electric wiring 31.

In FIG. 2, there is not shown an electric circuit supplying the field winding of the electromagnetic coupling 3. But, the field winding of the electromagnetic coupling 3 can be supplied an electric current from the secondary winding 11 by connecting electrically the sliprings 6 with the D.C. terminals of the converter 12.

Thus the exciting method or exciting circuit of the electric machine arrangement combining electromagnetic coupling 3 with the electric rotating machine 8 becomes very simple and efficient in operation and may be readily and economically manufactured and installed. It is not necessary to install another electric source.

In FIG. 2 or 3, another alternating current source 33 is electrically connected with the primary winding 10 of the transformer 9. However, if the capacity or power of the current winding 34 is large, the small capacity of the alternating current source 33 is enough.

In FIG. 5, it is not necessary to install another electric source. The current windings 34 of FIG. 3, FIG. 4, FIG. 5, FIG. 6, FIG. 8 and FIG. 9 act as stabilizers that are used for keeping the transient stability high. If the load currents of the electric machines combining the electric machines 8 with the electromagnetic coupling 3 become suddenly large, the exciting currents of the field windings of the electric machines increase owing to the current increase in the current windings 34; therefore, the transient stabilities of these electric machines increase. In FIG. 6 or FIG. 9, the speed of the load 2 can be higher than the speed of the driving machine. In FIG. 7 or FIG. 8, the direction of rotation of one propeller 35 can be the same as or opposite to the direction of rotation of the other propeller 36.

While the invention has been particularly shown and described with reference to preferred embodiments thereof, it will be understood by those skilled in the art that various changes in form and details may be made therein without departing from the spirit and scope of the invention.

What is claimed is:

1. Electric machine arrangement comprising in combination:
   an electric rotating machine having a stator, a rotor, a field winding and an armature winding in which alternating current flows;
   an electromagnetic coupling having two rotors which rotate with respect to each other, one of which is provided with an armature winding, and the other of which is provided with a field winding;
   one of the said two rotors of the said electromagnetic coupling being mechanically combined with the said rotor of the said electric rotating machine;
   the said armature winding of the said electromagnetic coupling and the said armature winding of the said electric rotating machine being electrically connected with each other;
   a transformer having at least one primary winding and a secondary winding;
   a converter which is composed of rectifiers;
   at least one of the said field windings and the secondary winding of the said transformer being connected electrically through the said converter;
   one of the said armature windings being connected electrically with the said primary winding of the transformer;
   wherein one of the said rotors of the electromagnetic coupling being arranged to drive a load, and the other rotor of the electromagnetic coupling being arranged to be driven by a driving machine.

2. Electric machine arrangement as claimed in claim 1, wherein one of the two rotors of the electromagnetic coupling is mechanically combined with the rotor of the electric rotating machine in such a manner that a rotor of which a circumferential inner part of a cylinder is provided with a magnetic member forming a magnetic circuit for the electromagnetic coupling and of which a circumferential outer part of the cylinder is provided with a magnetic member forming a magnetic circuit for the electric rotating machine is used in common as one of the two rotors of the electromagnetic coupling and as the rotor of the electric rotating machine, and rotates in a space between the stator of the electric rotating machine and the other rotor of the electromagnetic coupling.

3. Electric machine arrangement as claimed in claim 1, wherein the driving machine is a prime mover for propulsion of a ship such as an internal combustion engine, a steam turbine and a gas turbine, and the load is a propeller of the ship.

4. Electric machine arrangement as claimed in claim 1, wherein the rotor of the electromagnetic coupling combined mechanically with the rotor of the electric rotating machine drives the load, and the other rotor of the electromagnetic coupling is driven by the driving machine.

5. Electric machine arrangement as claimed in claim 4, wherein the field winding of the electric rotating machine is connected electrically with the secondary winding of the transformer through the converter, and the armature winding of the electromagnetic coupling is connected electrically with the primary winding of the transformer.

6. Electric machine arrangement as claimed in claim 1, wherein the rotor of the electromagnetic coupling combined mechanically with the rotor of the electric rotating machine is driven by the driving machine and the other rotor of the electromagnetic coupling drives the load.

7. Electric machine arrangement as claimed in claim 1, wherein the rotor of the electromagnetic coupling combined mechanically with the rotor of the electric rotating machine is driven by the driving machine and drives a propeller of a ship, and the other rotor of the electromagnetic coupling drives another propeller of the ship.

8. Electric machine arrangement as claimed in claim 6, wherein the field winding of the electromagnetic coupling is connected electrically with the secondary winding of the transformer through the converter, and the armature winding of the electric rotating machine is connected electrically with the primary winding of the transformer.

9. Electric machine arrangement as claimed in claim 7, wherein the field winding of the electric rotating machine is connected electrically with the secondary winding of the transformer through the converter, and the armature winding of the electric rotating machine is connected electrically with the primary winding of the transformer.

10. Electric machine arrangement as claimed in claim 1, wherein the primary winding of the transformer is a voltage winding which is electrically connected with the armature winding of the electromagnetic coupling.

11. Electric machine arrangement as claimed in claim 1, wherein the primary winding of the transformer is a current winding which is electrically connected between the armature winding of the electromagnetic coupling and the armature winding of the electric rotating machine.

12. Electric machine arrangement as claimed in claim 1, wherein the primary winding of the transformer is a voltage winding which is electrically connected with an electric source other than the armature windings of the electromagnetic coupling and of the electric rotating machine.

13. Electric machine arrangement as claimed in claim 1, wherein the transformer has two kinds of primary windings one of which is a voltage winding connected electrically with the armature winding of the electromagnetic coupling and the other of which is a current winding connected electrically between the armature winding of the electromagnetic coupling and the armature winding of the electric rotating machine.

14. Electric machine arrangement as claimed in claim 1, wherein the transformer has two kinds of primary windings one of which is a voltage winding connected electrically with an electric source other than the armature windings of the electromagnetic coupling and of the electric rotating machine and the other of which is a current winding connected electrically between the armature winding of the electromagnetic coupling and the armature winding of the electric rotating machine.

15. Electric machine arrangement as claimed in claim 1, wherein there is provided a second converter which is composed of rectifiers and whose D.C. terminals are connected electrically in series with the D.C. terminals of the converter described in claim 1 to the one of the field windings; further, the A.C. terminals of the second converter are connected electrically with an electric source other than the armature windings of the electromagnetic coupling and of the electric rotating machine.

* * * * *